Jan. 17, 1928.  1,656,881
F. W. SPERR, JR., ET AL
PROCESS AND APPARATUS FOR LIQUID PURIFICATION OF FUEL GASES
Filed Aug. 7, 1924   5 Sheets-Sheet 4

INVENTOR
Frederick W Sperr Jr
David L Jacobson
By
Munday Clarke & Liwster Attys Jan. 17, 1928.  1,656,881
F. W. SPERR, JR., ET AL
PROCESS AND APPARATUS FOR LIQUID PURIFICATION OF FUEL GASES
Filed Aug. 7, 1924   5 Sheets-Sheet 5

INVENTOR
Frederick W Sperr Jr
David Jacobson
By Munday Clarke &c attys

Patented Jan. 17, 1928.

1,656,881

UNITED STATES PATENT OFFICE.

FREDERICK W. SPERR, JR. AND DAVID L. JACOBSON, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

PROCESS AND APPARATUS FOR LIQUID PURIFICATION OF FUEL GASES.

Application filed August 7, 1924. Serial No. 730,676.

This invention relates to the liquid purification of fuel gases, and more particularly to the elimination of hydrogen sulphide from fuel gases, for example coal gas, water gas, and the like.

In the prior copending application of the undersigned applicant Sperr, Ser. No. 718,253, filed June 6, 1924, Patent No. 1,578,560, there is described a process and apparatus for the purification of fuel gases from the last traces of $H_2S$, by washing the gas with an alkaline liquid, preferably an aqueous solution of sodium carbonate, aerating the impurity laden solution with resulting transfer of the hydrogen sulphide to a volume of air, and washing the air with a liquid containing a freshly precipitated iron compound with resulting purification of the air, reduction of the hydrogen sulphide to sulphur in easily removable form and simultaneous regeneration of the iron compound suspension. In that process and apparatus the preferred mode of aerating the said suspension consisted in forcing air into the same in a finely atomized condition, by passing the air through porous plates or the like composed of ceramic material, earthenware, alundum or the like.

An object of the present invention is to achieve a like complete elimination and destruction of hydrogen sulphide, to the last traces, contained in fuel gases, with employment of fewer operations and of a greatly simplified and smaller installation for any given output.

The invention includes broadly a process and apparatus for the purpose specified wherein the gas is washed with a suspension or solution of freshly precipitated iron compound in an alkaline liquid and the impurity laden liquid regenerated by aeration, and preferably by forcing air in finely atomized state through the suspension in substantially similar way to the aeration of the air washing suspension described in the prior specification referred to.

It has been discovered by applicants that by the use of the intensely active, freshly precipitated iron compound, especially in combination with the finely atomized air for regenerating the suspension, the transfer of the impurities in the gas to a stream of air is rendered unnecessary. This dispenses with the large aerating apparatus of the prior specification in which the alkaline liquid with which the gas is washed is regenerated with indirect transference of hydrogen sulphide of the gas to the air.

The invention further consists in such other new and useful improvements, and has for further objects such other operative advantages or results, as may be found to obtain in the processes and apparatus hereinafter described or claimed.

In order that the invention may be fully understood there will now be described by way of example and with reference to the accompanying drawings several installations for carrying out the process.

In these drawings.

In all these figures similar references refer to corresponding parts.

Figure 1:
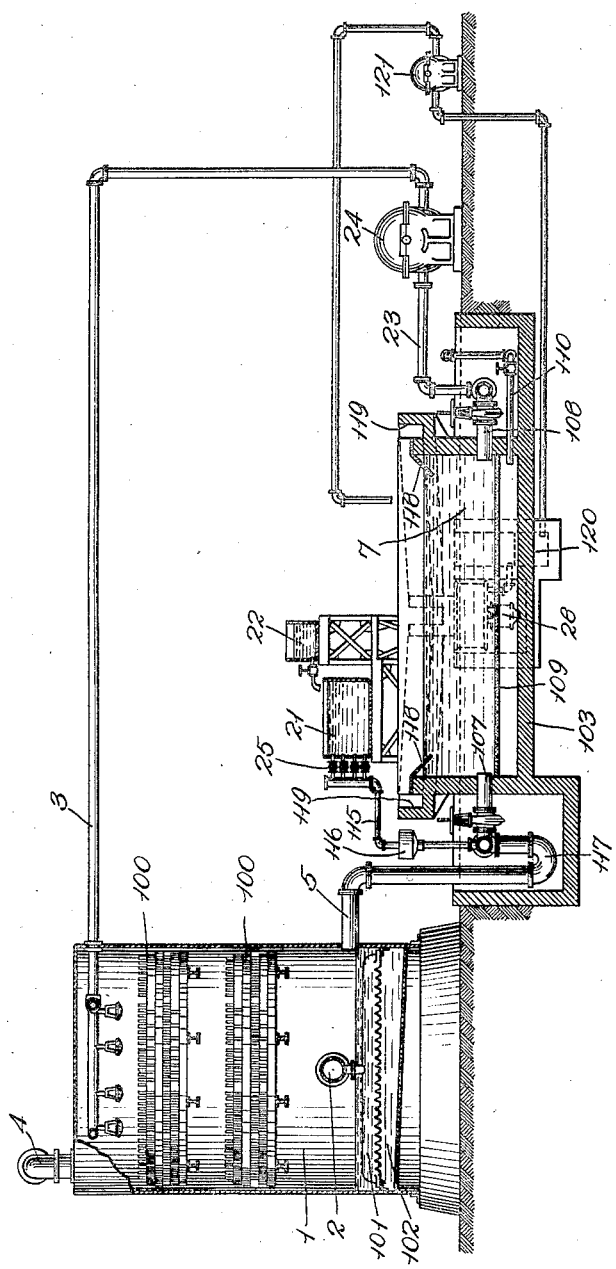
Figure 1 is an elevation of a preferred form of installation.

In the specific instance now to be described, coal gas is purified from hydrogen sulphide by washing with a suspension of freshly precipitated iron compound in a scrubber 1, into which the gas enters at the inlet 2, flows upwardly in countercurrent with the liquid, and is discharged in completely purified condition at 4. The gas scrubber in Fig. 1 is filled in its upper part with hurdles 100 and according to one feature of the inventon also has a lower section filled with bubbling trays 101. The function of this section is to cause the gas to bubble through a layer or pool 102 of the suspension before it strikes the hurdles. This layer of wash liquid takes out a large percentage of the hydrogen sulphide and its action relieves a considerable burden from the hurdles, especially when treating high sulphur gases. Also if the gas contains suspended matter such as tar, etc., this is largely precipitated in the lower section and prevented from stopping up the hurdles. Moreover, by having a mass of wash liquor constantly in the lower section of the gas scrubber, the action of the process is steadied and fluctuations in gas rate or circulation rate are minimized in effect.

The wash liquid sprays into the top of the scrubber 1 and is introduced by a pipe 3. The impurity laden liquid flows out of the scrubber through the pipe 5 having bends therein as shown in the drawings and is transferred directly, by gravity, into the aerator 7. According to the present invention the aerator is of the form described in the prior specification in which air is forced through plates having minute pores, and has an aerating sump 103 with three compartments 104, 105 and 106 equipped with inlet manifold connections 107 joined to the pipe 5 and outlet manifold connections 108. The system is arranged so that the solution may be circulated through the compartments in series or in parallel, and so that any one of the compartments may be shut off for cleaning without disturbing the operation of the other. The bottom of each compartment is covered or partly covered with porous plates or blocks 109 (filtros, alundum or other material) under which compressed air is forced from a pipe 110. The porous material should not be coarser in texture than "grade R" filtros.

The regenerated liquid is drawn from the manifold connections 108 into a pipe 23 by the pump 24 and then driven through the pipe 3 to the scrubber 1 where it acts upon fresh gas.

The equipment for preparing the freshly precipitated iron compound for the gas wash liquid will now be described. This comprises a feed tank 21 which has two compartments 111, 112 filled with a solution of sodium carbonate and a second feed tank 22 with two corresponding compartments 113, 114 filled with a solution of ferric sulphate. A sufficient amount of ferric sulphate is run in to tank 21 to react with the sodium carbonate forming ferric carbonate according to the reaction.

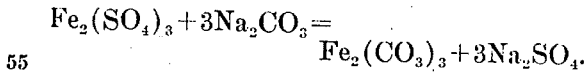

$$Fe_2(SO_4)_3 + 3Na_2CO_3 = Fe_2(CO_3)_3 + 3Na_2SO_4.$$

It is probable that some basic ferric carbonate is also formed.

The ferric carbonate is allowed to settle in the form of a sludge and the supernatant solution of sodium sulphate is drawn off through the manifold 25. The ferric carbonate sludge is added from time to time to the wash liquor in circulation, the addition being made through pipes 115 and a feed box 116 to the wash liquor flowing through a section 117 of the pipe 5, or else directly to sump of the aerator 7. The additions are regulated so that the equivalent of about 1% $Fe_2O_3$ is maintained in the wash liquor. In practice the amount of iron compound varies according to the amount of sulphur in the gas and according to the rate at which the gas is being treated, but ordinarily the percentage in the wash liquor is between 0.5% and 1.5%.

In the above method of operation, the compartments 111, 113 in tanks 21 and 22 are used alternately with the compartments 112, 114, the one set being employed for preparing the sludge, while the other is being used for feeding the sludge into the system. It is possible to substitute for the ferric sulphate in 22 any other soluble ferric salt, or a ferrous salt may be employed. In the latter case, it is desirable to aerate the precipitate formed to convert it as much as possible to the ferric condition before it enters the system, which aeration is preferably done by the porous plate method employed in the main system.

Instead of precipitating the ferric compound outside the system, it may be formed directly in the system. In this case, tank 21 is filled with a solution of a ferric salt, such as ferric sulphate, and this is added to the system through pipes 115 and feed box 116. Ferrous salts may also be used, but here it is desirable to increase the amount of aeration in the sump 7 so as to produce the maximum amount of ferric compound. When additions are made directly to the system, sufficient sodium carbonate should be added to maintain excess alkalinity equivalent to approximately 3% sodium carbonate.

The sulphur liberated in the aerator as hereinafter described floats to the surface of the wash liquid in a foamy mass which is carried by the movement of the liquor over the skimming plates 118 into a trough 119 shown annexed to the aerator. In this trough it is carried to a centrifuge 28 where the sulphur is separated, the liquor running into a sump 120 and being pumped back into the system through pump 121.

Figure 2:
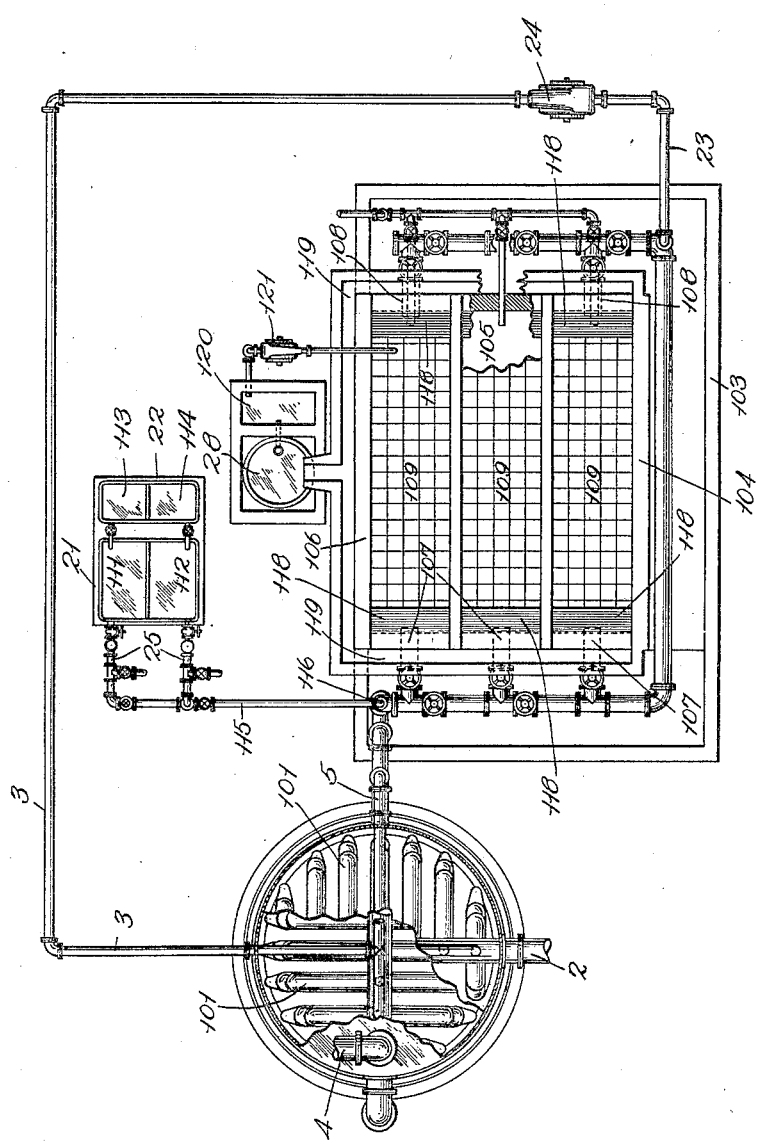
Fig. 2 shows a plan view of the installation shown in Fig. 1 and also of the installation shown in Fig. 3.
Figure 3:
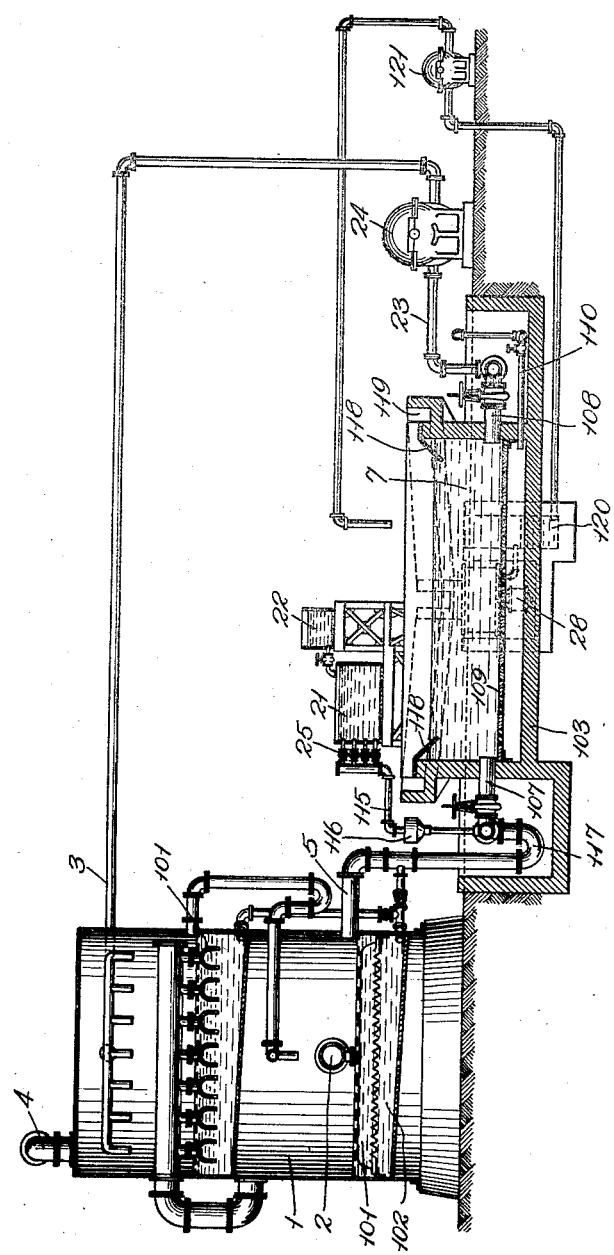
Fig. 3 is an elevation of an installation in which the scrubber contains two bubbling tray sections arranged in series.

In the modifications shown in Figs. 1–3 there are shown skimming plates at both ends of the aerator compartments and the trough surrounds the upper portion of the wall of the aerator sump on three sides and discharges into the centrifuge at the middle of the middle branch of the trough.

Figure 4:
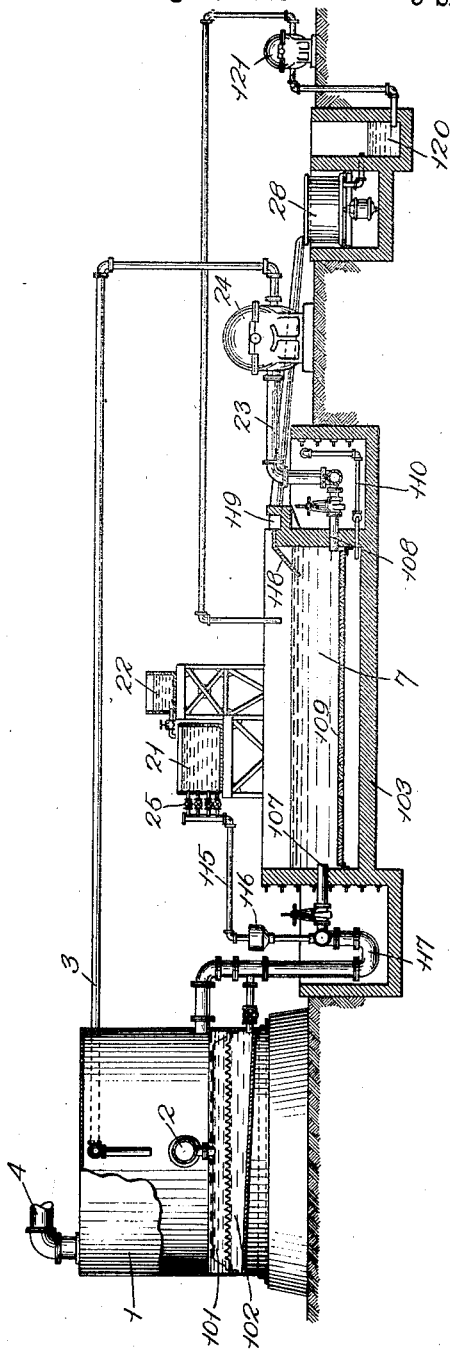
Fig. 4 is an elevation of another form of installation in which the gas contains only a single bubbling tray section, and in which the centrifuge for separating the sulphur is located differently from the form shown in Figs. 1, 2 and 3.
Figure 5:
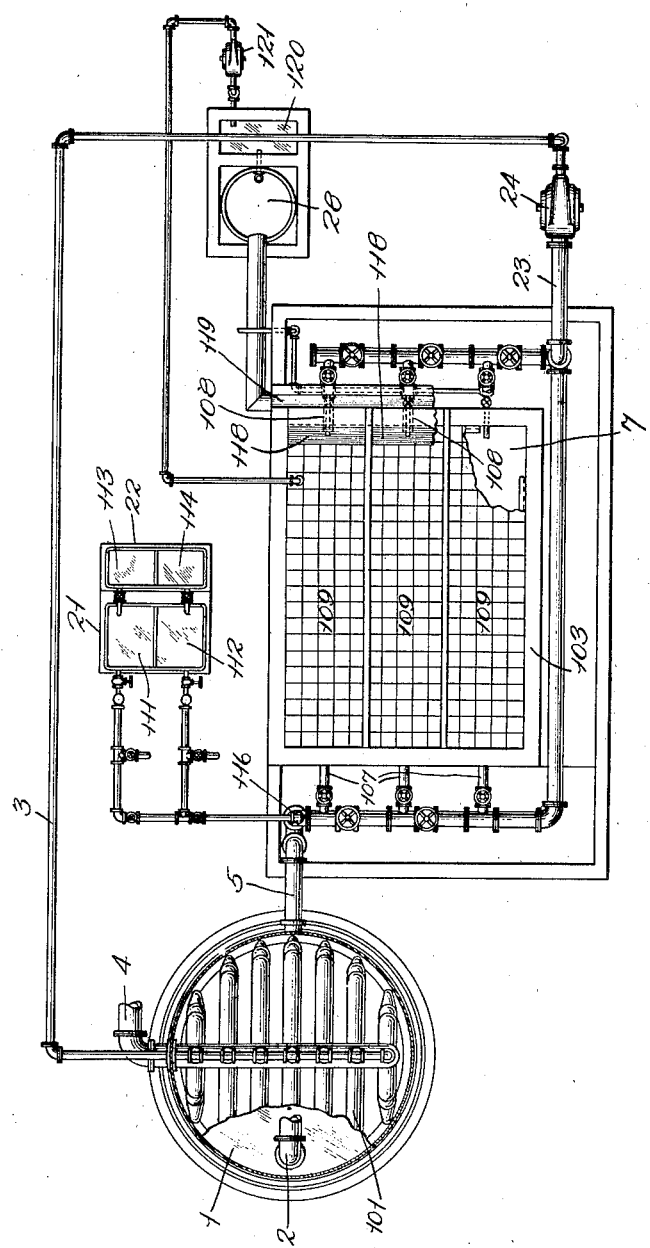
Fig. 5 is a plan view of the installation shown in Fig. 4.

In the modification shown in Figs. 4 and 5 the skimming plates and trough are provided at one end only of the aerator.

The operation of the process is as follows:

The aerator sump 103 is filled with a dilute solution of sodium carbonate. In treating ordinary coal gas, the strength of the solution employed is maintained equivalent to about 3% sodium carbonate. The strength may be increased or decreased according as the amount of hydrogen sulphide is greater or less, but ordinarily not more than 4% sodium carbonate is required.

Instead of sodium carbonate, other soluble alkalies or alkali-metal carbonates may be employed. The oxide, hydroxide, or carbonate of magnesium may also be used. The iron compound is added to the system, as described above, or the required percentage of iron compound may be maintained by adding ferric sulphide ($Fe_2S_3$) to the aerator sump.

In any case, the essential point is that the iron compound must be in freshly precipitated form, and preferably in the form of ferric carbonate or hydroxide. It is important to make the additions of the iron compound to the system regularly and systematically so as to maintain the required percentage as uniform as possible. It is probable that the primary reaction in the gas washing operation is between hydrogen sulphide and sodium carbonate $$H_2S + Na_2CO_3 = NaHS + NaHCO_3.$$

The sodium hydrosulphide reacts with the ferric carbonate $$3NaHS + Fe_2(CO_3)_3 = Fe_2S_3 + 3NaHCO_3.$$

Complete removal of the last traces of hydrogen sulphide from the gas is readily obtained.

The type of aerating apparatus employed for regeneration of the active iron compound is extremely important. The aeration may be done in a tower filled with hurdles, but this tower must be of extremely and impracticably large dimensions because of the slowness of oxidizing iron suspensions resulting from the gas purification by aeration as ordinarily carried out. The discovery has been made in the present process that if the air used for treating such suspensions be very finely divided or practically atomized as by passing it through a porous plate, immersed in the suspension, very remarkable results are obtained.

In explanation of the remarkable results obtained with the porous plate method of introducing air for actification, it may be stated that the oxidation of the iron sulphide is done almost entirely by dissolved oxygen. The essential thing therefore is to get the maximum amount of oxygen into actual solution in wash liquor. The rate of solution of oxygen by ordinary methods of exposure to air is very slow but when the air is forced into the wash liquor in the form of very minute particles, conditions are made favorable for obtaining the maximum rate of solution of the oxygen. In the first place, an enormous surface is obtained in these bubbles for exposure of the oxygen to the dissolving medium. In the second place, solution is facilitated by pressure, and the particles, on account of the natural hydrostatic pressure of the solution and on account of their own surface tension, are under a pressure much higher than normal. The mechanical agitation of the wash liquor produced in this method also favors high efficiency of actification.

The oxidation of the iron compounds is extraordinarily rapid and may be effected with a relatively small volume of air. In practice, from 50 to 175 grains of hydrogen sulphide are oxidized per square foot of porous plate surface per minute, the air rate being from 3 to 8 cubic feet per square foot per minute. An average of 100 grains hydrogen sulphide per square foot per minute with an air rate of 5 cubic feet per square foot per minute is a good working standard. An aerator surface of this type 10 feet square has as great capacity as a tower 16 feet in diameter filled with closely packed hurdles to a depth of 30 feet.

The action of the air depends upon its oxygen content and is essentially as follows:

$$2Fe_2S_3 + 3O_2 = 2Fe_2O_3 + 6S.$$
$$Fe_2O_3 + 3H_2O = 2Fe(OH)_3.$$

The ferric hydroxide probably reacts with sodium bicarbonate as follows:

$$2Fe(OH)_3 + 6NaHCO_3 = Fe_2(CO_3)_3 + 3Na_2CO_3 + 6H_2O.$$

It is also important that the rate of actification or oxidation of the iron sulphur compound in the aerator sump must be equal to the rate at which hydrogen sulphide is taken up in the absorber. The apparatus must, therefore, be designed so that the oxidizing capacity of the aerator is greater than the rate at which hydrogen sulphide is to be taken up in the absorber. If this is not done, the amount of active ferric compound entering the absorber will be insufficient to react with all of the sodium hydrosulphide formed. When this point is reached, sodium hydrosulphide will appear in the solution entering the aerator and this will cause a very great reduction or even a total inhibition of the reaction $$2Fe_2S_3 + 3O_2 = 2Fe_2O_3 + 6S.$$

The efficiency of the process then falls off very greatly, and a large consumption of sodium carbonate is required on account of increased secondary reactions forming sodium thiocyanate, thiosulphate, etc.

The point at which insufficient absorption is reached is immediately recognized by appearance of sodium hydrosulphide in the solution leaving the absorber and by appearance of hydrogen sulphide in the air over the aerator. It is important to control the process so that such appearance does not occur.

With sufficient aerator capacity, secondary reactions are reduced to a minimum, and no hydrogen sulphide appears in the air over the aerator.

In the absorber 1, the bubbling section or sections might be dispensed with in the case of gases relatively low in hydrogen sulphide and free from suspended impurities. With such gases good results have been obtained with towers filled simply with hurdles. Other forms of packing may also be used, the essential point being to avoid any type in which the suspended material in the wash liquid is liable to build up and cause stoppages. Mechanical scrubbers may be used with good results. Scrubbers with two or more bubbling sections, such as the scrubber shown in Figure 3, may also be employed and are especially suitable for treating dirty gases. A scrubber with a single bubbling section, such as the one shown in Figure 4, may be used where high efficiency is not especially desired and two or more such scrubbers may be connected in series for complete purification.

Hydrocyanic acid is also removed by the process, but only a comparatively small amount combines with the iron, most of it reacting otherwise, as for example by forming thiocyanates.

The invention as hereinabove set forth or exemplified may be variously practiced or embodied within the scope of the claims hereinafter made.

We claim:

1. A process for the elimination of hydrogen sulphide from fuel gases, consisting in washing the gas with a suspension of freshly precipitated iron compound in an alkaline liquid and regenerating the impurity laden suspension from the gas washing operation by forcing air in finely atomized state through the said suspension.

2. A process as claimed in claim 1 in which the aeration of the impurity laden iron suspension in alkaline liquid is effected by passing air through finely porous material, and in which the sulphur separated from the suspension during the aeration stage is continuously skimmed off the liquid as it is formed.

3. Apparatus for eliminating hydrogen sulphide from fuel gases comprising, a gas scrubber, an aerator adapted to force air in finely atomized state through liquid contained therein, and a system for circulating gas washing liquid to and fro between the gas scrubber and the aerator.

4. Apparatus as claimed in claim 3 in which the aerator comprises a tank having plates of finely porous material in contact with the liquid in the tank, and means for forcing air through the plates into the liquid.

5. Apparatus as claimed in claim 3, in which the scrubber comprises a bubbling tray section arranged at the gas inlet end of the scrubber.

6. Apparatus as claimed in claim 3, in which the scrubber comprises one or more bubbling tray sections in series with a group of hurdles or the like.

7. Apparatus as claimed in claim 3, in which the capacity of the aerator is adequate to oxidize the impurity laden liquid at a rate at least equal to the rate at which hydrogen sulphide passes through the scrubber or scrubbers.

8. Apparatus as claimed in claim 3, in which the aerator comprises a trough, skimming plates arranged between the aerator tank and the trough and means for drying the sulphur passing over said plates into the trough and for returning the removed liquid to the aerator tank.

9. An apparatus as claimed in claim 3, in which the aerator capacity is in excess of the gas-scrubber capacity, so as to maintain an excess of unsulphided gas-scrubbing liquid in the system.

10. A process for the elimination of hydrogen sulphide from fuel gases, consisting in washing the gas with a suspension of iron compound in an alkaline liquid and regenerating the impurity laden suspension from the gas washing operation by forcing air in finely atomized state through the said suspension.

11. A cyclic process for the elimination of hydrogen sulphide from fuel gases consisting in: washing the gas with a suspension of precipitated iron compound in alkaline liquid, regenerating the spent liquid with separation of sulphur therefrom in the same stage of operation by aerating said spent liquid, returning the original liquid to the gas washing stage and making additions to the liquid of iron compounds in finely divided and highly active state.

12. A cyclic process for the elimination of hydrogen sulphide from fuel gases consisting in: washing the gas with a suspension of precipitated iron compound in alkaline liquid, regenerating the spent liquid with separation of sulphur therefrom in the same stage of operation by aerating said spent liquid, returning the original liquid to the gas washing stage and making additions of precipitated iron compounds to the liquid, the added precipitate being added as a freshly prepared precipitate.

13. A cyclic process for the elimination of hydrogen sulphide from fuel gases consisting in: washing the gas with a suspension of precipitated iron compound in alkaline liquid, regenerating the spent liquid with separation of sulphur therefrom in the same stage of operation by aerating said spent liquid, returning the original liquid to the gas washing stage and adding iron compound to the liquid, the added iron compound being added in such state that the liquid continues to contain precipitated iron compound as a freshly prepared one, whereby an amount of finely divided and very active iron compound is maintained continuously in the liquid.

In testimony whereof we have hereunto set our hands.

FREDERICK W. SPERR, Jr.
DAVID L. JACOBSON.